(12) United States Patent
Yoshizawa

(10) Patent No.: US 9,019,388 B2
(45) Date of Patent: Apr. 28, 2015

(54) IMAGING DEVICE CAPABLE OF PERFORMING RELEASE OPERATION BY TOUCH INPUT, AND IMAGING METHOD AND STORAGE MEDIUM FOR THE SAME

(75) Inventor: Kenji Yoshizawa, Ome (JP)

(73) Assignee: Casio Computer Co., Ltd., Tokyo (JP)

(*) Notice: Subject to any disclaimer, the term of this patent is extended or adjusted under 35 U.S.C. 154(b) by 253 days.

(21) Appl. No.: 13/618,936

(22) Filed: Sep. 14, 2012

(65) Prior Publication Data

US 2013/0070112 A1    Mar. 21, 2013

(30) Foreign Application Priority Data

Sep. 16, 2011  (JP) ................. 2011-202567

(51) Int. Cl.
H04N 5/232    (2006.01)
(52) U.S. Cl.
CPC ....... *H04N 5/23293* (2013.01); *H04N 5/23248* (2013.01)
(58) Field of Classification Search
CPC .................................. H04N 5/23293
USPC ............................ 348/208.1, 208.2
See application file for complete search history.

(56) References Cited

U.S. PATENT DOCUMENTS

| 8,064,759 B1* | 11/2011 | Kahn et al. ............. 396/53 |
| 8,144,203 B2 | 3/2012 | Washisu |
| 8,471,916 B2 | 6/2013 | Washisu |
| 8,477,201 B2 | 7/2013 | Washisu |
| 2008/0231714 A1* | 9/2008 | Estevez et al. ......... 348/208.16 |
| 2010/0062803 A1* | 3/2010 | Yun et al. ................. 455/556.1 |
| 2011/0280556 A1 | 11/2011 | Ibi et al. |

FOREIGN PATENT DOCUMENTS

| JP | 04-316025 A | 11/1992 |
| JP | 06-282378 A | 10/1994 |
| JP | 11-212726 A | 8/1999 |
| JP | 11-252427 A | 9/1999 |
| JP | 11252427 A * | 9/1999 |

(Continued)

OTHER PUBLICATIONS

Japanese Office Action dated Oct. 16, 2013 (and English translation thereof) in counterpart Japanese Application No. 2011-202567.

*Primary Examiner* — Gary C Vieaux
(74) *Attorney, Agent, or Firm* — Holtz, Holtz, Goodman & Chick PC

(57) ABSTRACT

The present invention prevents unnecessary imaging operations when imaging is not required to be performed. In the present invention, a display panel includes a touch panel provided on the top surface thereof. An image sensor of an imaging section captures an image. A gyro sensor detects the movement of an imaging device. When the movement of the imaging device is detected by the gyro sensor, a control section prohibits an imaging operation by the imaging section in response to a touch operation performed on the touch panel. Conversely, when the movement of the imaging device is not detected by the gyro sensor, the control section performs an imaging operation by the imaging section in response to a touch operation on the touch panel.

9 Claims, 7 Drawing Sheets

(56) References Cited

FOREIGN PATENT DOCUMENTS

| | | | |
|---|---|---|---|
| JP | 2002296663 A | * | 10/2002 |
| JP | 2007-093967 A | | 4/2007 |
| JP | 2007-236008 A | | 9/2007 |
| JP | 2008-148160 A | | 6/2008 |
| JP | 2008148160 A | * | 6/2008 |
| JP | 2008-311821 A | | 12/2008 |
| JP | 2010-220202 A | | 9/2010 |

* cited by examiner

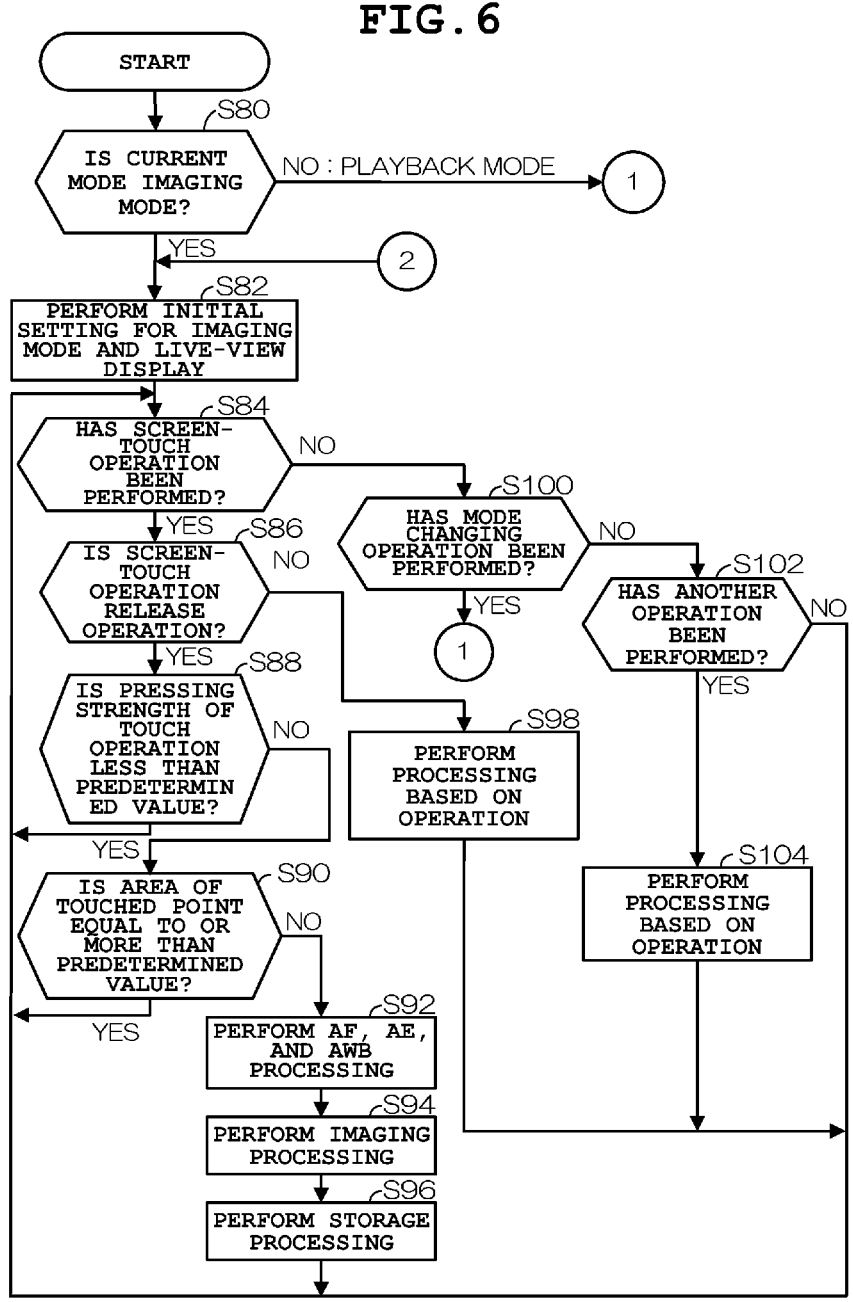

IMAGING DEVICE CAPABLE OF PERFORMING RELEASE OPERATION BY TOUCH INPUT, AND IMAGING METHOD AND STORAGE MEDIUM FOR THE SAME

CROSS-REFERENCE TO RELATED APPLICATION

This application is based upon and claims the benefit of priority from the prior Japanese Patent Application No. 2011-202567, filed Sep. 16, 2011, the entire contents of which is incorporated herein by reference.

BACKGROUND OF THE INVENTION

1. Field of the Invention

The present invention relates to an imaging device, an imaging method and a storage medium.

2. Description of the Related Art

Commonly, image capturing by a camera including a touch panel is performed by a user touching the panel and auto-focus (AF), auto-exposure (AE), and auto white-balance (AWE) being performed on the touched point. However, there may be cases where image capturing is inadvertently performed as a result of the user accidentally touching the touch panel without any intention to capture an image or an object coming in contact with the touch panel while the user is unaware.

Japanese Patent Application Laid-Open (Kokai) Publication No. 11-252427 discloses a technology in which, in order to suppress image blurring in a camera that performs release by its screen being touched, an imaging operation is started after being delayed for a predetermined amount of time from a touch operation.

With the above-described conventional technology where imaging operation is started after being delayed for a predetermined amount of time from a touch operation to suppress image blurring, release processing can be prevented from starting when the touch panel is slightly touched by mistake. However, there is a problem in that a time-lag until an image is captured occurs and the photo opportunity is missed.

An object of the present invention is to provide an imaging device, an imaging method, and a storage medium by which unnecessary imaging operations when imaging is not required to be performed can be prevented.

SUMMARY OF THE INVENTION

In order to achieve the above-described object, in accordance with one aspect of the present invention, there is provided an imaging device including a touch input section on a display section, comprising: an imaging section which captures an image; a detecting section which detects movement of the imaging device; a release executing section which performs a release operation on the touch input section; and a control section which controls to prohibit an imaging operation by the imaging section in response to the release operation performed on the touch input section by the release executing section, when the movement of the imaging device is detected by the detecting section, and to perform an imaging operation by the imaging section in response to the release operation performed on the touch input section by the release executing section, when the movement of the imaging device is not detected by the detecting section.

In accordance with another aspect of the present invention, there is provided an imaging device including a touch input section on a display section, comprising: an imaging section which captures an image; a release executing section which performs a release operation on the touch input section; a condition judging section which judges a touch condition of a touch operation performed on the touch input section separately from the release operation by the release executing section; and a control section controls to prohibit an imaging operation by the imaging section when the release executing section performs the release operation on the touch input section and the condition judging section judges that the touch operation performed on the touch input section is in a predetermined condition, and to perform an imaging operation by the imaging section when the release executing section performs the release operation on the touch input section and the condition judging section judges that the touch operation is not in the predetermined condition.

In accordance with another aspect of the present invention, there is provided an imaging method for an imaging device including a touch input section on a display section, comprising: an imaging step of capturing an image; a detecting step of detecting movement of the imaging device; a release executing step of performing a release operation on the touch input section; and a control step of controlling to prohibit an imaging operation in the imaging step in response to the release operation performed on the touch input section in the release executing step, when the movement of the imaging device is detected in the detecting step, and to perform an imaging operation in the imaging step in response to the release operation performed on the touch input section in the release executing step, when the movement of the imaging device is not detected in the detecting step.

In accordance with another aspect of the present invention, there is provided an imaging method for an imaging device including a touch input section on a display section, comprising: an imaging step of capturing an image; a release executing step of performing a release operation on the touch input section; a condition judging step of judging a touch condition of a touch operation performed on the touch input section separately from the release operation in the release executing step; and a control step of controlling to prohibit an imaging operation in the imaging step when the release operation on the touch input section is performed in the release executing step and the touch operation performed on the touch input section is judged to be in a predetermined condition in the condition judging step, and to perform an imaging operation in the imaging step when the release operation on the touch input section is performed in the release executing step and the touch operation is judged not to be in the predetermined condition in the condition judging step.

In accordance with another aspect of the present invention, there is provided a non-transitory computer-readable storage medium having stored thereon a program that is executable by a computer in an imaging device including a touch input section on a display section, the program being executable by the computer to perform functions comprising: imaging processing for capturing an image; detection processing for detecting movement of the imaging device; release execution processing for performing a release operation on the touch input section; and control processing for controlling to prohibit an imaging operation by the imaging processing in response to the release operation performed on the touch input section by the release execution processing, when the movement of the imaging device is detected by the detection processing, and to perform an imaging operation by the imaging processing in response to the release operation performed on the touch input section by the release execution processing, when the movement of the imaging device is not detected by the detection processing.

In accordance with another aspect of the present invention, there is provided a non-transitory computer-readable storage medium having stored thereon a program that is executable by a computer in an imaging device including a touch input section on a display section, the program being executable by the computer to perform functions comprising: imaging processing for capturing an image; release execution processing for performing a release operation on the touch input section; condition judgment processing for judging a touch condition of a touch operation performed on the touch input section separately from the release operation by the release execution processing; and control processing for controlling to prohibit an imaging operation by the imaging processing when the release execution processing performs the release operation on the touch input section and the condition judgment processing judges that the touch operation performed on the touch input section is in a predetermined condition, and to perform an imaging operation by the imaging processing when the release execution processing performs the release operation on the touch input section and the condition judgment processing judges that the touch operation is not in the predetermined condition.

The present invention has an advantage in that unnecessary imaging operations when imaging is not required to be performed can be prevented.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a flowchart for describing operations of the third embodiment; and

DETAILED DESCRIPTION OF THE PREFERRED EMBODIMENTS

Preferred embodiments of the present will hereinafter be described with reference to the drawings.

A. First Embodiment

A-1. Structure of the First Embodiment

Figure 1:
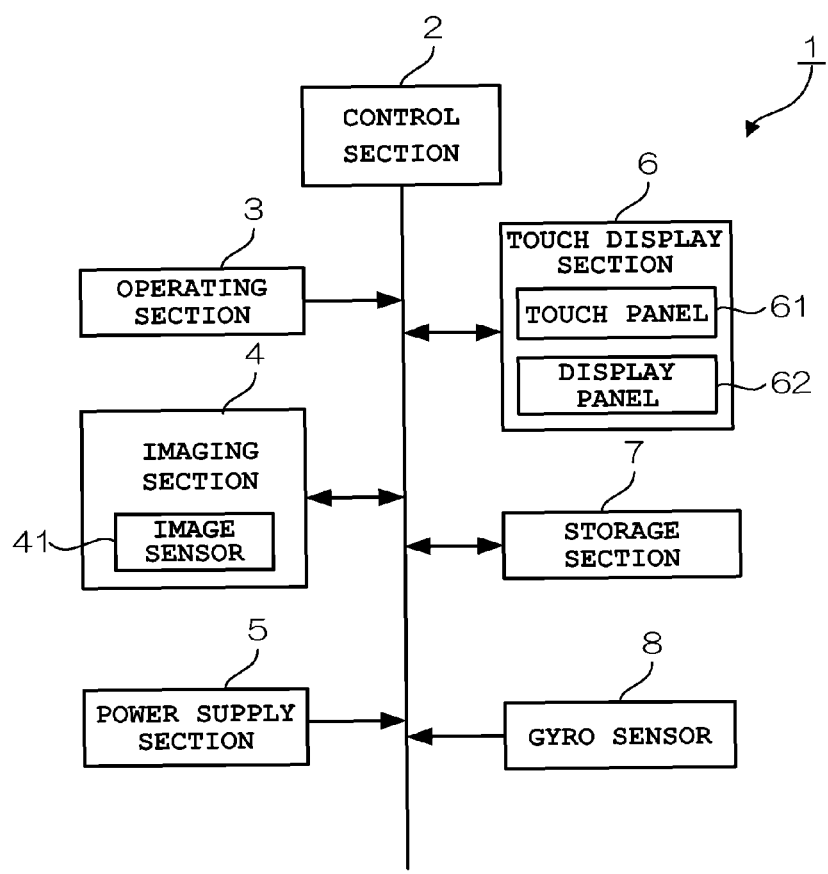
FIG. 1 is a block diagram showing the structure of an imaging device according to a first embodiment of the present invention.

FIG. 1 is a block diagram showing the structure of an imaging device 1 according to a first embodiment of the present invention. The imaging device 1 in FIG. 1 includes a control section 2, an operating section 3, an imaging section (image sensor 41) 4, a power supply section 5, a touch display section (touch panel 61 and display panel 62) 6, a storage section 7, and a gyro sensor 8. The control section 2 is a single-chip microcomputer that controls each section of the imaging device 1. Specifically, in the first embodiment, the control section 2 judges whether or not the imaging device 1 has moved using the gyro sensor 8, and sets a release prohibiting flag based on a movement detection result. In addition, the control section 2 judges whether or not a screen-touch operation has been performed on the touch panel 61. Moreover, when a release operation (operation to touch a release button actualized by a software key, or operation to select a subject on which auto-focus is to be performed and give an instruction to capture the image) is performed on the touch panel 61, the control section 1 judges whether or not the execution of imaging operation has been prohibited, based on the setting contents of the release prohibiting flag (or in other words, based on whether or not the imaging device 1 has moved), and performs control.

The operating section 3 includes a plurality of operation keys, such as a shutter switch, a zoom switch, a mode key, a SET key and a cross-shaped key, and outputs to the control section 2 operating signals based on key operations by a user. The imaging section 4, which includes a focus lens, a zoom lens, the image sensor 41, etc, forms an image of a subject on the image sensor 41, and after converting the light of the projected subject into electrical signals, outputs them. The power supply section 5 is constituted by, for example, a secondary battery, and supplies power to each section.

The touch display section 6 includes the touch panel 61 and the display panel 62. The display panel 62 includes a color liquid crystal display (LCD) or an organic electroluminescent (EL) display, a backlight, and drive circuits thereof. When the imaging device 1 is in an imaging standby state, the display panel 62 performs live-view display in which a subject captured by the imaging section 4 is displayed in real-time. During image playback, the display panel 62 displays a recorded image that has been read-out from the storage section 7 and expanded.

Figure 7A:
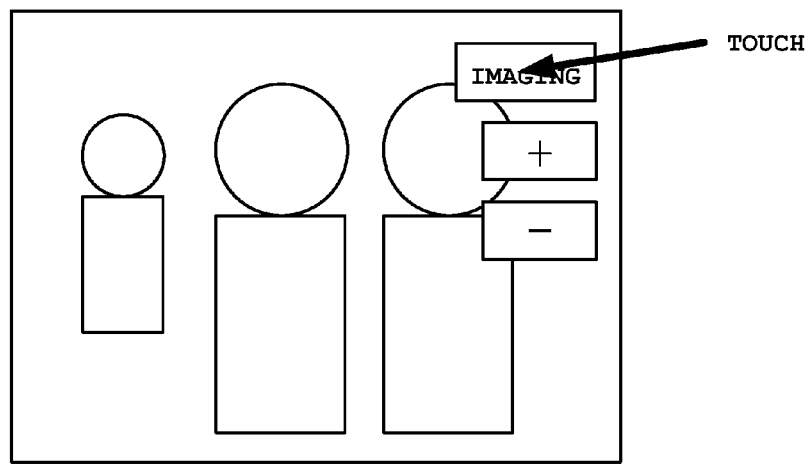
FIG. 7A is a diagram for describing a software release key and FIG. 7B is a diagram for describing touch release.
Figure 7B:
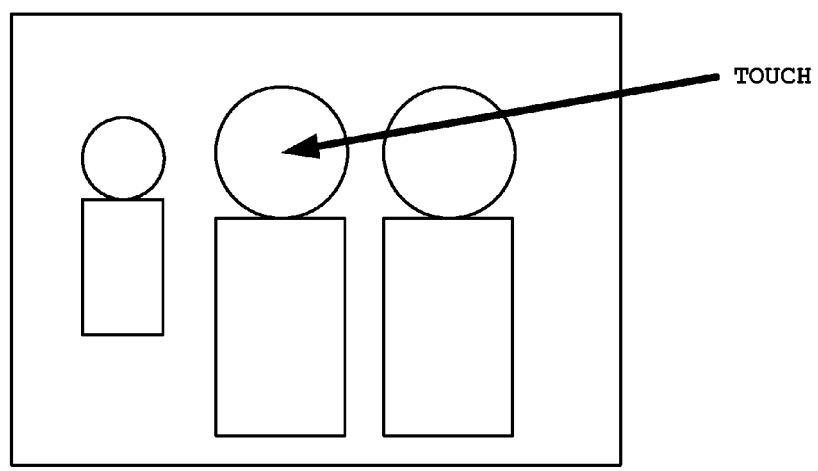

The touch panel 61 is a transmissive touch sensor provided on the display panel 62, and touched points are correlated with points (coordinates) on the display panel 62. Specifically, in the first embodiment, the touch panel 61 is used when a release button is actualized by a software key as shown in FIG. 7A, or when release is performed in response to a touch operation on a subject, such as a person, on which auto-focus is to be performed as shown in FIG. 7B.

The storage section 7 includes a memory that stores captured image data, and a memory that stores programs required by the control section 2 to control each section of the imaging device 1 and data required for controlling each section. The gyro sensor 8 is a camera-shake amount detecting section included to detect angular velocity (yaw and pitch) relative to a reference axis. In the first embodiment, the control section 2 judges whether or not the imaging device 1 has moved, based on output from the gyro sensor 8 when a touch operation is performed. Note that, instead of the gyro sensor 8, an acceleration sensor may be used in the method for detecting the movement of the imaging device 1. In addition, the movement may be detected by changes in output from the image sensor 41.

A-2. Operations of the First Embodiment

Next, operations of the above-described first embodiment will be described.

Figure 2:
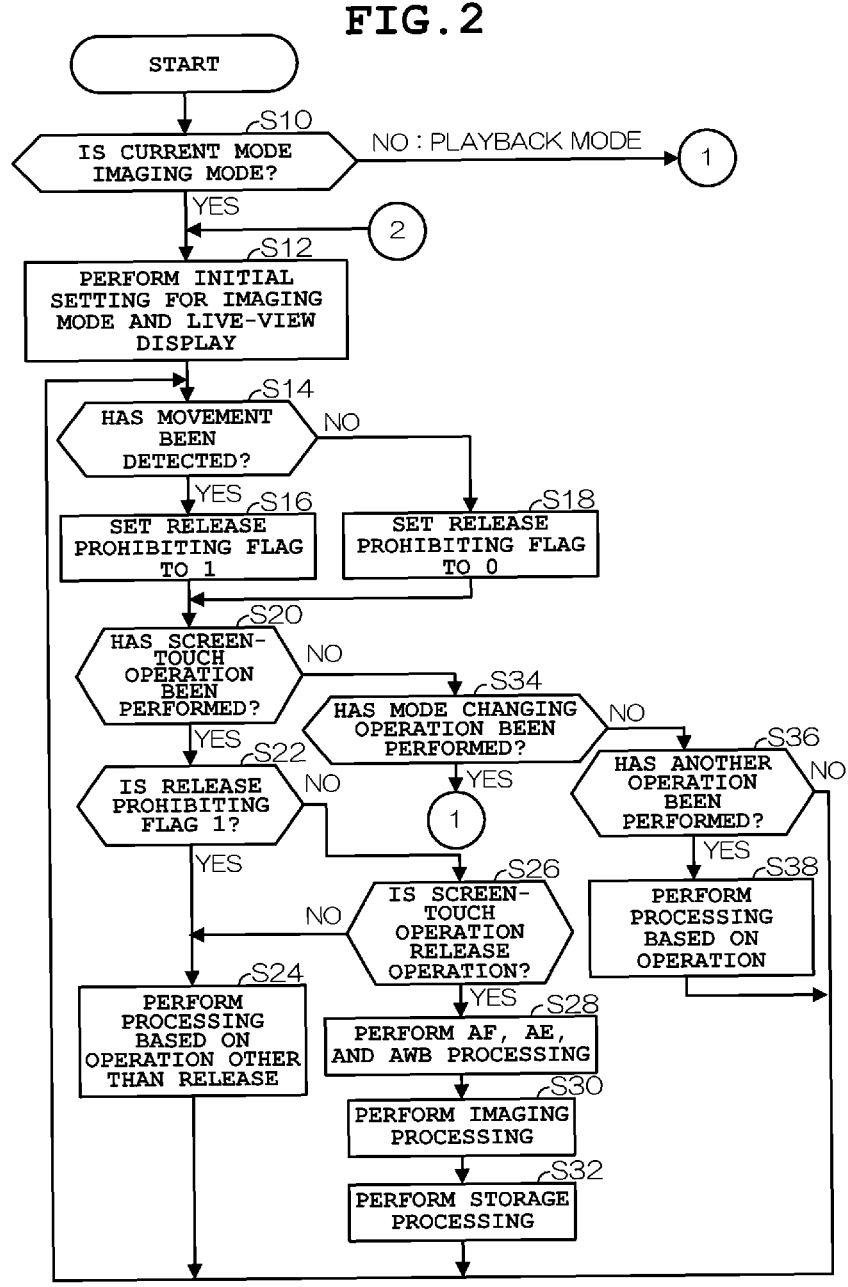
FIG. 2 is a flowchart for describing operations of the first embodiment.
Figure 3:
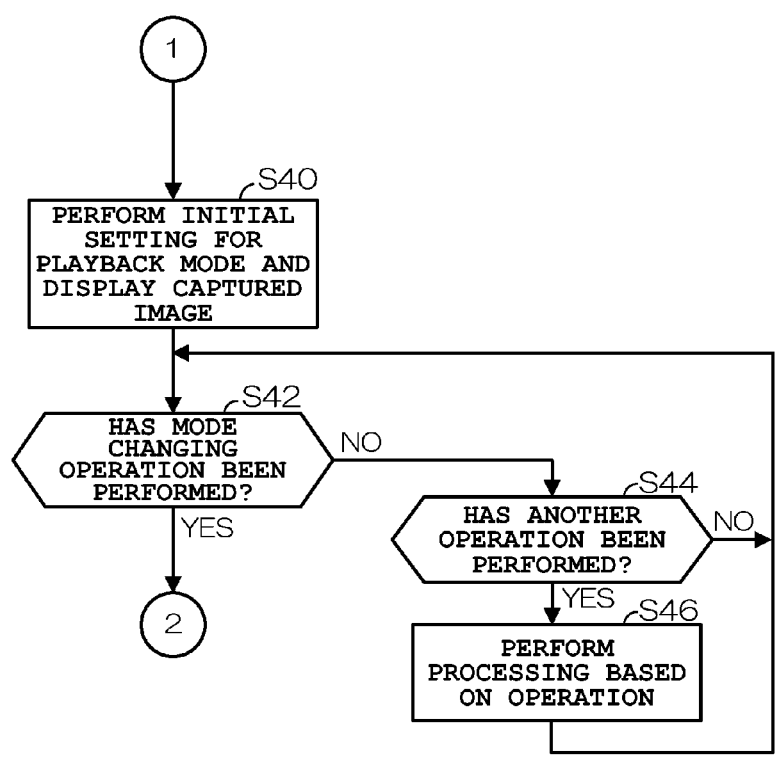
FIG. 3 is also a flowchart for describing operations of the first embodiment.

FIG. 2 and FIG. 3 are flowcharts for describing operations of the first embodiment. First, the control section 2 judges whether or not the current mode is an imaging mode (Step S10). When judged that the current mode is an imaging mode (YES at Step S10), the control section 2 performs an initial setting for the imaging mode, and performs live-view display to display an image captured by the imaging section 4 directly on the display panel 62 (Step S12). Next, the control section 2 judges whether or not the movement of the imaging device 1 has been detected by the gyro sensor 8 (Step S14). Note that, since the imaging device 1 shakes even by a release operation, it is preferable that the movement is judged to have been detected when a detection value from the gyro sensor 8 is equal to or more than a predetermined threshold value.

Also note that the movement may be detected by an acceleration sensor or by changes in output from the image sensor 41 (existing technologies) besides the gyro sensor 8. When judged that the movement of the imaging device 1 has been detected (YES at Step S14), the control section 2 sets the release prohibiting flag to "1" (Step 16). Conversely, when judged that the movement of the imaging device 1 has not been detected (NO at Step S14), the control section 2 sets the release prohibiting flag to "0" (Step S18).

Next, the control section 2 judges whether or not the user has performed a screen-touch operation on the touch panel 61 (Step S20). When judged that a screen-touch operation has been performed on the touch panel 61 (YES at Step S20), the control section 2 judges whether or not the release prohibiting flag is "1" (Step S22). Then, when judged that the release prohibiting flag is "1" (YES at Step S22), the control section 2 performs processing based on the operation (such as exposure setting, zooming, or setting) other than release (Step S24), and returns to Step S14.

That is, when a screen-touch operation is performed while the imaging device 1 is moving, this screen-touch operation is considered not to be a user operation for capturing an image. Accordingly, the imaging operation of the imaging device 1 is not started, and processing based on the operation (such as exposure setting, zooming, or setting) other than release is performed.

Conversely, when judged that the release prohibiting flag is not "1" (NO at Step S22), the control section 2 judges whether or not the screen-touch operation is a release operation (an existing technique such as a touch operation on a subject) (Step S26). When judged that the screen-touch operation is not a release operation (NO at Step S26), the control section 2 performs processing based on the operation (such as exposure setting, zooming, or setting) other than release (Step S24), and returns to Step S14.

That is, when a screen-touch operation is performed while the imaging device 1 is not moving, unless the screen-touch operation is a release operation (an existing technique such as a touch operation on a subject), the imaging operation of the imaging device 1 is not started, and processing based on the operation (such as exposure setting, zooming, or setting) other than release is performed.

Conversely, when judged that the screen-touch operation is a release operation (YES at Step S26), the control section 2 performs processing such as AF, AE, and AWE (Step S28), and performs imaging processing by the image sensor 41 of the imaging section 4 (Step S30). Then, the control section 2 performs storage processing to store the captured image in the storage section 7 (Step S32), and subsequently returns to Step S14.

That is, when a screen-touch operation is performed while the imaging device 1 is not moving, if the screen-touch operation is a release operation, the imaging operation of the imaging device 1 is started in which AF processing, AE processing, AWB processing, imaging processing, and storage processing are performed.

At Step S20, when judged that a screen-touch operation has not been performed (NO at Step S20), the control section 2 judges whether or not a mode changing operation has been performed (Step S34). When judged that a mode changing operation has not been performed (NO at Step S34), the control section 2 judges whether or not another operation (such as a touch operation on the setting key) has been performed (Step S36). Then, when judged that another operation (such as a touch operation on the setting key) has been performed (YES at Step S36), the control section 2 performs processing based on the operation (Step S38), and returns to Step S14. Conversely, when judged that another operation (such as a touch operation on the setting key) has not been performed (NO at Step S36), the control section 2 returns to Step S14 without performing any processing.

When judged at Step S10 that the current mode is not an imaging mode (NO at Step S10), or when judged at Step S34 that a mode changing operation has been performed (YES at Step S34), the control section 2 performs initial setting for a playback mode and displays a captured image (Step S40 in FIG. 3). Then, the control section 2 judges whether or not a mode changing operation has been performed (Step S42). When judged that a mode changing operation has been performed (YES at Step S42), because the changing operation in this case is to change the current mode to an imaging mode, the control section 2 returns to Step S12 and repeats the above-described processing.

Conversely, when judged that a mode changing operation has not been performed (NO at Step S42), the control section 2 judges whether or not another operation (such as an operation to perform image forwarding, zooming, or slideshow) has been performed (Step S44). When judged that another operation (such as an operation to perform image forwarding, zooming, or slideshow) has been performed (YES at Step 44), the control section 2 performs processing based on the operation (Step S46) and returns to Step S42). Conversely, when judged that another operation has not been performed (NO at Step S44), the control section 2 returns to Step S42.

According to the above-described first embodiment, when the movement of the imaging device 1 is detected using the gyro sensor 8, the execution of imaging operation is prohibited even if a release operation, which is a characteristic of the touch panel 61 and by which imaging is performed on a touched point on the touch panel 61, is performed. Conversely, when a release operation is performed without the movement of the imaging device 1 being detected by the gyro sensor 8, the imaging operation is performed. Therefore, unnecessary imaging operations when the device is moving and imaging is not required to be performed can be prevented.

Also, in the configuration of the above-described first embodiment, the movement of the imaging device 1 is detected by the gyro sensor 8 or an acceleration sensor. Accordingly, unnecessary imaging operations can be prevented from being performed, simply by using the gyro sensor 8 or the acceleration sensor included for optical image blur correction, or by including a commonly used gyro sensor 8 or acceleration sensor.

Variation Example 1

In variation example 1, a camera-shake correction function is further provided in the above-described first embodiment.

Specifically, a function is provided in which a known camera-shake correcting means is used to correct movement components corresponding to the cycle and amplitude of camera shake, among movement components of the imaging device 1 detected by the gyro sensor 8, the acceleration sensor, or by changes in output from the image sensor 41 (or among movement components of the imaging device 1 detected by a dedicated camera-shake detecting section).

In this example, in the detection of the movement of the imaging device 1 at Step S14, a movement is detected that has a cycle or an amplitude exceeding the cycle and amplitude of camera shake correctable by the camera-shake correction function.

In the detection of the movement of the imaging device 1 at Step S14 when the camera-shake correction function is off, a movement may be detected that includes the cycle and amplitude of camera shake correctable by the camera-shake correction function.

As described above, the camera-shake correcting section which corrects camera shake is included in this example. When the movement of the imaging device is detected and the amount of the movement is correctable by the camera-shake correcting section, the camera-shake correcting section corrects the camera shake. As a result of this configuration, movement when imaging is required to be performed and movement when imaging is not required to be performed can be differentiated.

In addition, since the imaging operation of the imaging device 1 is not prohibited when a movement amount correctable by the camera-shake correcting section is detected, the control of a release operation on the touch panel and camera-shake correction can both be performed.

Variation Example 2

In variation example 2, in the detection of the movement of the imaging device 1 at Step S14, a movement including position change, or in other words, a movement made by the imaging device 1 tilted at an angle is detected.

As a result of this configuration, movement when imaging is required to be performed and movement when imaging is not required to be performed can be differentiated.

In the above-described first embodiment, output from the image sensor 41 included in the imaging device 1 may be monitored, and the movement of the imaging device 1 may be detected by changes in the output from the image sensor 41. In this instance, unnecessary imaging operations can be prevented from being performed simply by image processing, without a special sensor or the like being mounted.

B. Second Embodiment

Next, a second embodiment of the present invention will be described.

B-1. Structure of the Second Embodiment

In the second embodiment, when a release operation is performed on the touch panel 61 and the movement of the imaging device 1 is detected, the imaging operation of the imaging device 1 is prohibited. On the other hand, when the movement of the imaging device 1 is not detected, the imaging operation of the imaging device 1 is performed. As a result, movement detection time required for preventing unnecessary imaging can be reduced, whereby the power consumption can be reduced. Note that the structure of the imaging device 1 is the same as that in FIG. 1, and therefore explanation thereof is omitted.

B-2. Operations of the Second Embodiment

Figure 4:
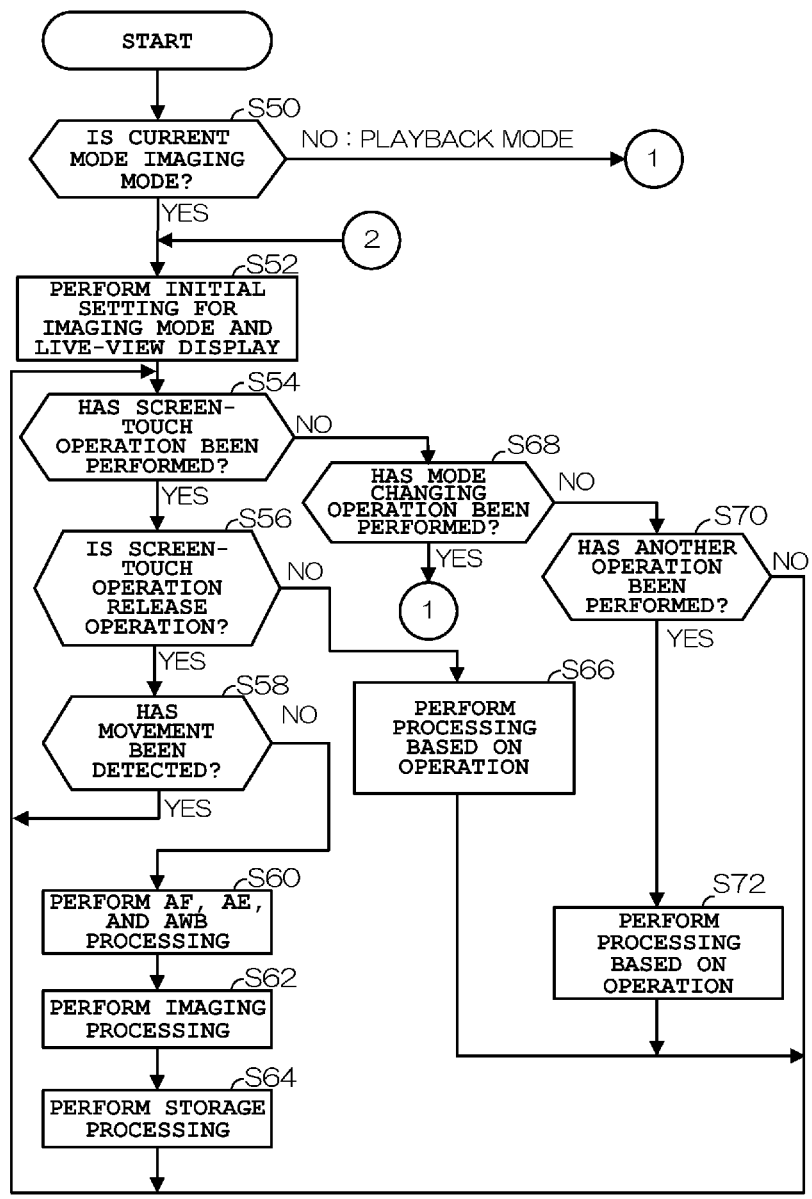
FIG. 4 is a flowchart for describing operations of a second embodiment of the present invention.

FIG. 4 is a flowchart for describing operations of the second embodiment. First, the control section 2 judges whether or not the current mode is an imaging mode (Step S50). When judged that the current mode is an imaging mode (YES at Step S50), the control section 2 performs an initial setting for the imaging mode, and performs live-view display to display an image captured by the imaging section 4 directly on the display panel 62 (Step S52). Next, the control section 2 judges whether or not the user has performed a screen-touch operation on the touch panel 61 (Step S54). When judged that a screen-touch operation has been performed on the touch panel 61 (YES at Step S54), the control section 2 judges whether or not the screen-touch operation is a release operation (an existing technique such as a touch operation on a subject) (Step S56).

Then, when judged that the screen-touch operation is a release operation (YES at Step S56), the control section 2 judges whether or not movement of the imaging device 1 has been detected by the gyro sensor 8 (Step S58). Note that, since the imaging device 1 shakes even by a release operation, it is preferable that the movement is judged to have been detected when a detection value from the gyro sensor 8 is equal to or more than a predetermined threshold value. Also note that the movement may be detected by an acceleration sensor or by changes in output from the image sensor 41 (existing technologies) besides the gyro sensor 8. When judged that the movement of the imaging device 1 has been detected (YES at Step S58), the control section 2 does not start the imaging operation of the imaging device 1 and returns to Step S54 without performing AE processing, AF processing, and AWB processing. That is, even when the screen-touch operation is a release operation, the imaging operation is not performed if the movement of the imaging device 1 is detected.

Conversely, when judged that the movement of the imaging device 1 has not been detected (NO at Step S58), the control section 2 performs processing such as AE processing, AF processing, and AWB processing (Step S60), and performs imaging processing by the image sensor 41 of the imaging section 4 (Step S62). Then, the control section 2 performs storage processing to store the captured image in the storage section 7 (Step S64), and subsequently returns to Step S54. That is, when the screen-touch operation is a release operation and the imaging device 1 is not moving, the imaging operation of the imaging device 1 is started in which AE processing, AF processing, and AWE processing, imaging processing, and storage processing are performed.

At Step S56, when judged that the screen-touch operation is not a release operation (NO at Step S56), the control section 2 performs processing based on this operation (which may be, for example, a touch operation on the setting key) (Step S66), and returns to Step S54.

At Step S54, when judged that a screen-touch operation on the touch panel 61 has not been performed (NO at Step S54), the control section 2 judges whether or not a mode changing operation has been performed (Step S68). When judged that a mode changing operation has been performed (NO at Step S68), the control section 2 judges whether or not another operation (such as exposure setting, zooming, or setting) has been performed (Step S70). When judged that another operation (such as exposure setting, zooming, or setting) has been performed (YES at Step S70), the control section 2 performs processing based on the operation (Step S72) and returns to Step S54. Conversely, when judged that another operation (such as exposure setting, zooming, or setting) has not been performed (NO at Step S70), the control section 2 returns to Step S54 without performing any processing.

When judged at Step S50 that the current mode is not an imaging mode (NO at Step S50) or when judged at Step S68 that a mode changing operation has been performed (YES at Step S68), the control section 2 controls operations in accordance with the flowchart in FIG. 3, as in the case of the first embodiment.

According to the above-described second embodiment, when a touch operation performed on the touch panel 61 is judged to be a release operation and the movement of the imaging device 1 is detected, the imaging operation of the imaging device 1 is prohibited. On the other hand, when the movement of the imaging device 1 is not detected, the imaging operation of the imaging device 1 is performed. As a result, movement detection time required for preventing unnecessary imaging can be reduced, whereby the power consumption can be reduced.

Also, in the configuration of the above-described second embodiment, the movement of the imaging device 1 is detected by the gyro sensor 8 or an acceleration sensor. Accordingly, unnecessary imaging operations can be prevented from being performed, simply by including a commonly used gyro sensor 8 or acceleration sensor.

In the above-described second embodiment, output from the image sensor 41 included in the imaging device 1 may be monitored, and the movement of the imaging device 1 may be detected by changes in the output from the image sensor 41. In this instance, unnecessary imaging operations can be prevented from being performed simply by image processing, without a special sensor or the like being mounted.

C. Third Embodiment

A third embodiment of the present invention will be described.

In the third embodiment, whether or not the area of a point touched by a touch operation performed on the touch panel 61 is greater than a predetermined value is judged. Alternatively, whether or not the pressing strength of a touch operation performed on the touch panel 61 is greater than a predetermined value is judged. As a result, unnecessary imaging can be prevented when a touch condition is not a predetermined condition, or in other words, when a touch operation is considered to have not been made by a finger, a stylus, etc., or when the touch panel 61 is considered to have been mistakenly touched or come in contact with some object.

C-1. Structure of the Third Embodiment

Figure 5:
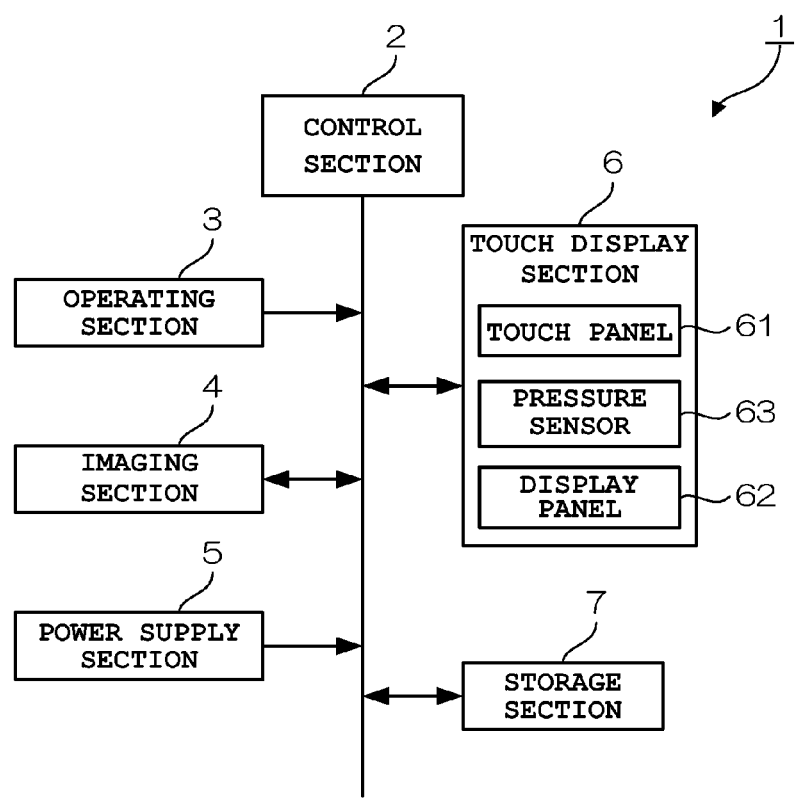
FIG. 5 is a block diagram showing the structure of an imaging device according to a third embodiment of the present invention.

FIG. 5 is a block diagram showing the structure of an imaging device according to a third embodiment. Note that sections corresponding to those in FIG. 1 are given the same reference numerals, and explanations thereof are omitted. In the touch panel 61, the area of a point touched by a touch operation performed on the touch panel 61 is detected, in addition to the touch operation itself. On the overall surface of the touch panel 61, a pressure sensor 63 is provided that detects the pressing strength of a touch operation applied to the touch panel 61. The control section 2 performs control to prevent unnecessary imaging when a touch condition is not a predetermined condition, or in other words, when a touch operation is considered to have not been made by a finger, a stylus, etc., or when the touch panel 61 is considered to have been mistakenly touched or come in contact with some object, based on the area of the touched point and the pressing strength of the touch operation.

C-2. Operations of the Third Embodiment

FIG. 6 is a flowchart for describing operations of the third embodiment. First, the control section 2 judges whether or not the current mode is an imaging mode (Step S80). When judged that the current mode is an imaging mode (YES at Step S80), the control section 2 performs an initial setting for the imaging mode and performs live-view display to display an image captured by the imaging section 4 directly on the display panel 62 (Step S82). Next, the control section 2 judges whether or not the user has performed a screen-touch operation on the touch panel 61 (Step S84). When judged that a screen-touch operation has been performed on the touch panel 61 (YES at Step S84), the control section 2 judges whether or not the screen-touch operation is a release operation (an existing technique such as a touch operation on a subject) (Step S86).

When judged that the screen-touch operation is a release operation (such as a touch operation on a subject) (YES at Step S86), the control section 2 judges whether or not the pressing strength of the screen-touch operation detected by the pressure sensor 63 is less than a predetermined value (Step S88). When judged that the pressing strength detected by the pressure sensor 63 is less than the predetermined value (YES at Step S88), the control section 2 considers the touch panel 61 to have been mistakenly touched or come in contact with some object, and therefore judges that the touch operation is not a release operation giving an instruction to perform imaging, and returns to Step S84 without performing an imaging operation.

Conversely, when judged that the pressing strength detected by the pressure sensor 63 is not less than the predetermined value (NO at Step S88), the control section 2 judges whether or not the area of the touched point on the touch panel 61 is equal to or more than a predetermined value (Step S90). When judged that the area of the touched point on the touch panel 61 is equal to or more than the predetermined value (YES at Step S90), the control section 2 considers the touch panel 61 to have not been touched by a finger, a stylus, etc., and therefore judges that the touch operation is not a release operation giving an instruction to perform imaging, and returns to Step S84 without performing an imaging operation.

On the other hand, when judged that the pressing strength detected by the pressure sensor 63 is not less than the predetermined value (NO at Step S88) and the area of the touched point on the touch panel 61 is not equal to or more than the predetermined value (NO at Step S90), the control section 2 judges that the touch panel 61 has not been mistakenly touched or come in contact with some object, and a release operation giving an instruction to perform imaging has been given by a finger, a stylus, etc. Accordingly, the control section 2 performs processing such as AE processing, AF processing, and AWB processing (Step S92), and performs imaging processing by the image sensor 41 of the imaging section 4 (Step S94). Then, the control section 2 performs storage processing to store the captured image in the storage section 7 (Step S96) and subsequently returns to Step S84.

At Step S86, when judged that the screen-touch operation is not a release operation (NO at Step S86), the control section 2 performs processing based on this operation (which may be, for example, a touch operation on the setting key) (Step S98) and returns to Step S84.

At Step S84, when judged that a screen-touch operation has not been performed (NO at Step S84), the control section 2 judges whether or not a mode changing operation has been performed (Step S100). When judged that a mode changing operation has not been performed (NO at Step S100), the control section 2 judges whether or not another operation (such as exposure setting, zooming, or setting) has been performed (Step S102). Then, when judged that another operation (such as exposure setting, zooming, or setting) has been performed (YES at Step S102), the control section 2 performs processing based on this operation (Step S104) and returns to Step S84. Conversely, when judged that another operation (such as exposure setting, zooming, or setting) has not been performed (NO at Step S102), the control section 2 returns to Step S84 without performing any processing.

When judged at Step S80 that the current mode is not an imaging mode (NO at Step S80), or when judged at Step S100 that a mode changing operation has been performed (YES at Step S100), the control section 2 controls operations in accordance with the flowchart in FIG. 3, as in the cases of the first embodiment and the second embodiment.

According to the above-described third embodiment, when a touch operation performed on the touch panel 61 is judged to be a release operation and this operation is judged to be in a predetermined condition, the imaging operation of the imaging device 1 is prohibited. On the other hand, when a touch operation is judged not to be in a predetermined condition, the imaging operation of the imaging device 1 is performed. As a result, even when a touch operation is judged to be a release operation, the touch panel 61 is considered to have been mistakenly touched if the touch operation is unnatural. Consequently, the imaging operation of the imaging device 1 is prohibited, whereby unnecessary imaging operations can be prevented from being performed.

In addition, in the third embodiment, whether or not a touch condition is a predetermined condition is judged based on judgment regarding whether or not the area of the point touched by the touch operation performed on the touch panel 61 is equal to or more than a predetermined value. When the touch operation is judged to be in the predetermined condition, the touch panel 61 is considered to have not been touched by a finger, a stylus, etc., and the imaging operation of the imaging device 1 is prohibited. Therefore, unnecessary imaging operations can be prevented from being performed.

Moreover, in the third embodiment, whether or not a touch condition is a predetermined condition is judged based on judgment regarding whether or not the pressing strength of the touch operation performed on the touch panel 61 is less than a predetermined value. When the touch operation is judged to be in the predetermined condition, the touch panel 61 is considered to have been mistakenly touched or come in contact with some object, and the imaging operation of the imaging device 1 is prohibited. Therefore, unnecessary imaging operations can be prevented from being performed.

Note that a configuration may be adopted in which the imaging operation of the imaging device 1 is prohibited when a point being touched is moved within a certain amount of time.

While the present invention has been described with reference to the preferred embodiments, it is intended that the invention be not limited by any of the details of the description therein but includes all the embodiments which fall within the scope of the appended claims.

What is claimed is:

1. An imaging device comprising:
   a display section on which a touch input section is provided;
   an imaging section which captures an image;
   a detecting section which detects movement of the imaging device;
   a release executing section which performs a release operation on the touch input section; and
   a control section which performs control to prohibit an imaging operation by the imaging section in response to the release operation, in a case in which the movement of the imaging device has already been detected by the detecting section at a time when the release operation is performed on the touch input section by the release executing section, and to perform an imaging operation by the imaging section in response to the release operation, in a case in which the movement of the imaging device has not been detected by the detecting section.

2. The imaging device according to claim 1, wherein the release executing section sets an auto-focus area based on a touched point, targeting an overall surface of the touch input section, and performs the release operation.

3. The imaging device according to claim 1, further comprising:
   a camera-shake correcting section which corrects camera shake,
   wherein the camera-shake correcting section performs camera-shake correction, when the movement of the imaging device is detected by the detecting section, and a movement amount is correctable by the camera-shake correction by the camera-shake correcting section.

4. The imaging device according to claim 3, wherein the control section does not prohibit the imaging operation by the imaging section when the movement amount correctable by the camera-shaking correction by the camera-shake correcting section is detected by the detecting section.

5. The imaging device according to claim 1, wherein the detecting section detects the movement of the imaging device by a gyro sensor or an acceleration sensor.

6. The imaging device according to claim 1, wherein the detecting section monitors an output from an image sensor included in the imaging device and detects the movement of the imaging device by detecting changes in the output from the image sensor.

7. The imaging device according to claim 1, further comprising:
   a flag changing section which changes a flag that manages prohibition and execution of the imaging operation by the control section, based on detection of the movement of the imaging device by the detecting section,
   wherein the control section maintains the prohibition and the execution of the imaging operation until the flag is changed by the flag changing section.

8. An imaging method for an imaging device including a touch input section on a display section, the method comprising:
   capturing an image;
   detecting movement of the imaging device;
   performing a release operation on the touch input section; and
   performing control to prohibit an imaging operation the capturing in response to the release operation, in a case in which the movement of the imaging device has already been detected in the detecting at a time when the release operation is performed on the touch input section, and to perform an imaging operation in the capturing in response to the release operation, in a case in which the movement of the imaging device has not been detected in the detecting.

9. A non-transitory computer-readable storage medium having stored thereon a program that is executable by a computer in an imaging device including a touch input section on a display section, the program being executable by the computer to perform functions comprising:
   imaging processing for capturing an image;
   detection processing for detecting movement of the imaging device;
   release execution processing for performing a release operation on the touch input section; and
   control processing for performing control to prohibit an imaging operation by the imaging processing in response to the release operation, in a case in which the movement of the imaging device has already been detected by the detection processing at a time when the release operation is performed on the touch input section by the release execution processing, and to perform an imaging operation by the imaging processing in response to the release operation, in a case wherein the movement of the imaging device has not been detected by the detection processing.

\* \* \* \* \*